Nov. 25, 1958 J. E. SCOTT 2,862,199

MAGNETIC DRUM STORAGE SYSTEM

Filed May 24, 1955 3 Sheets-Sheet 1

INVENTOR
JOHN E. SCOTT
BY
ATTORNEY

Nov. 25, 1958

J. E. SCOTT 2,862,199

MAGNETIC DRUM STORAGE SYSTEM

Filed May 24, 1955

3 Sheets-Sheet 2

INVENTOR
JOHN E. SCOTT
BY R. V. Craddock
ATTORNEY

INVENTOR
JOHN E. SCOTT
BY R. J. Craddock
ATTORNEY

United States Patent Office 2,862,199
Patented Nov. 25, 1958

2,862,199

MAGNETIC DRUM STORAGE SYSTEM

John E. Scott, Rego Park, N. Y., assignor to Sperry Rand Corporation, a corporation of Delaware Application May 24, 1955, Serial No. 510,606

5 Claims. (Cl. 340—174)

This invention relates to data storage systems, and more particularly, is concerned with recording of digital pulse information on a magnetic drum.

Recording of digital pulse information on a magnetic drum has been proposed heretofore. A common technique is the so-called "two-level return to zero" system in which the residual flux level for the magnetic drum surface is momentarily raised from a first level to a second level in response to a digital pulse, and then returned to the first level. The first level represents "0" digits and the second flux level on the drum represents "1" digits. The amount of information that can be packed on the drum, called the packing factor, depends among other factors on how closely together "1" digit pulses can be recorded. The packing factor can be improved by using pulses of very short duration, employing magnetic material with a high remanence, and by limiting the area over which the field produced by the recording head influences the magnetic surface of the drum. However, design limitations impose a practical limit on how close together "1" digit pulses can be recorded and still be reproducible as separate pulses distinguishable from each other and the noise background.

Another method heretofore proposed to record information on a magnetic drum is the so-called "two-level non-return to 0" system in which the residual flux level stays at a first level depending upon whether no pulses, corresponding to "0" digits, or pulses, corresponding to "1" digits, are received. While the packing factor for the latter system is in theory about twice that of the "return to zero" system, it is considerably more complicated in circuitry.

It is a general object of this invention to avoid and overcome the foregoing and other difficulties in and objections to the prior art practices by the provision of a magnetic drum recording system which has an improved packing factor yet which is relatively simple in its circuitry.

It is another object of this invention to provide a modified "return to zero" recording system having a greater packing factor than known "return to zero" systems and yet which avoids the complexity of the "non-return to zero" systems.

These and other objects of the invention which will become apparent as the description proceeds are achieved by providing a magnetic recording medium driven by a motor with means for successively applying a magnetically saturating field to said medium and applying a continuous reversed magnetizing field to the magnetically saturated medium to bring the medium to a non-saturated level. Information received in the form of electrical pulses is recorded by means which momentarily interrupts the continuous reversed magnetizing field for the duration of a received pulse. Means responsive to the change in the magnetic flux with each received pulse is provided for reproducing the pulse information from the magnetic recording medium.

For a better understanding of the invention reference should be had to the accompanying drawings, wherein.

Figures 1, 2, 4:
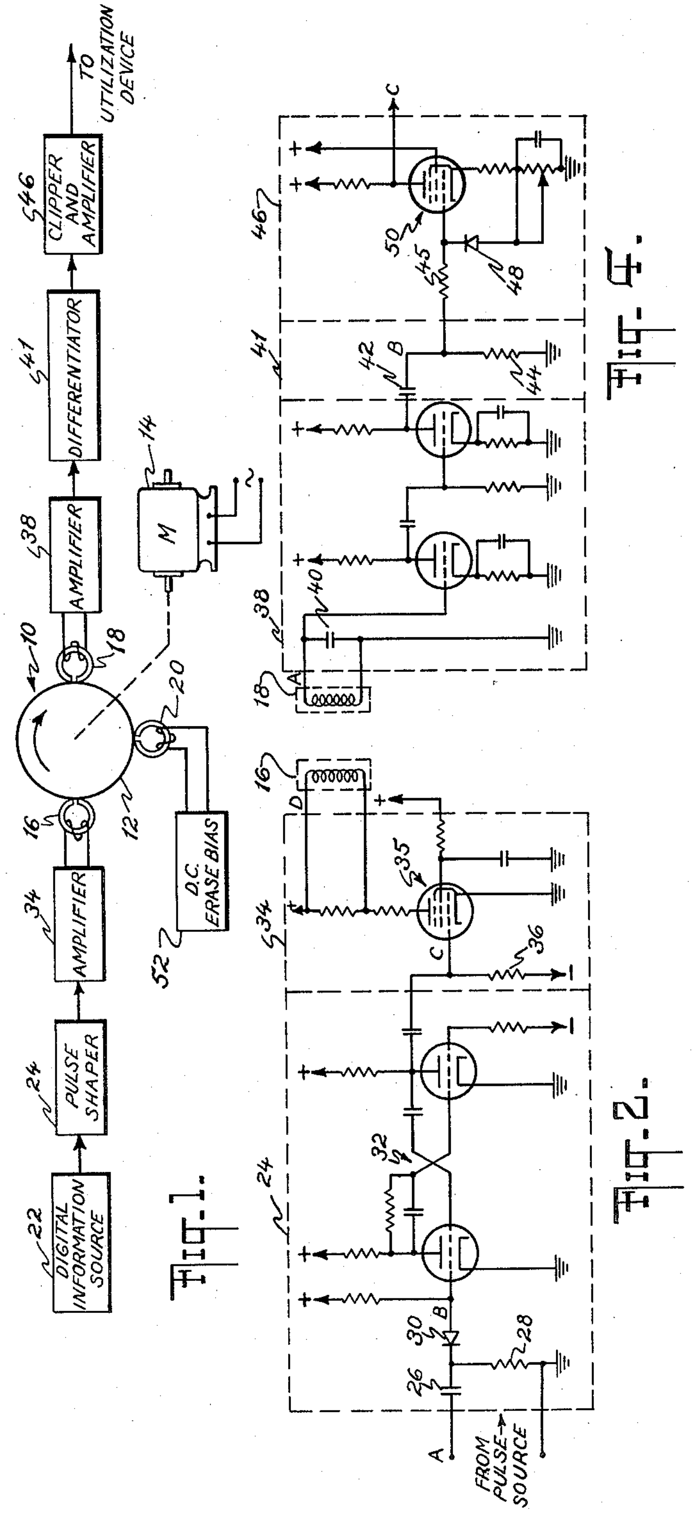
Fig. 1 is a block diagram of the magnetic storage system of the present invention.
Fig. 2 is a schematic circuit diagram of the recording circuit.
Fig. 4 is a schematic diagram of the reading circutt.

Referring to Fig. 1, the numeral 10 indicates generally a magnetic recording medium, which preferably is in the form of a cylindrical drum 12 of non-magnetic material such as brass with a surface coating of magnetic material. The drum 12 is rotated at high speed by a suitable motor 14. Fixedly positioned around the circumference of the drum 12 are a recording head 16, a reading head 18, and an erasing head 20. These heads may be of a type having a split-ring core providing a magnetic gap adjacent the magnetic surface of the drum, with a winding positioned on the core. While a single set of record, read, and erase heads are shown in Fig. 1, it is to be understood that a plurality of recording channels can be utilized on the drum by providing a number of such sets of recording, reading and erasing heads positioned axially along the surface of the drum.

The numeral 22 indicates generally a digital information source which puts out, for example, binary number information in the form of negative pulses for "1" digits and no pulses for "0" digits; Fig. 3A shows a typical pulse pattern. The output from the source 22 is coupled to a pulse shaper 24 which, as shown in the circuit diagram of Fig. 2, includes an R–C differentiating network at the input, as provided by a capacitor 26 and a resistor 28. A diode 30 couples the negative going portion of the differentiated signal as shown by the waveform of Fig. 3B, to a monostable multivibrator 32. The output of the multivibrator is a negative going pulse which is coupled to a single stage amplifier 34. The amplifier comprises a pentode 35 with the recording head 16 connected as a portion of the plate load. A bias voltage is applied to the control grid of the pentode amplifier stagt through a resistor 36, the bias voltage being set to provide a continuous plate current through the recording head 16. When a negative pulse is received from the multivibrator 32, the control grid of the single pentode stage is driven below cut-off, thus interrupting the flow of plate current through the recording head 16 for the duration of the pulse. Fig. 3A–D shows the waveform of the signal at the various indicated points in the circuit of Fig. 2, Fig. 3D representing the changing current through the recording head 16 in response to received pulses. The changing current in the recording head 16 produces changes in the flux pattern on the surface of the drum 12 in a manner which will be hereinafter more fully explained.

The variations in magnetic flux on the surface of the drum 12, on passing under the reading head 18 induce changing currents in the reading head which are amplified by a suitable two-stage amplifier, indicated at 38. A capacitor 40 across the input to the first stage of the amplifier 38 tunes the reading head 18 to the repetition frequency of the information pulses, to provide greater discrimination against noise. The amplifier 38 is provided with two triode amplifying stages with an R–C differentiating network 41 across the output of the second stage as provided by a capacitor 42 and a resistor 44.

Figures 3, 5:
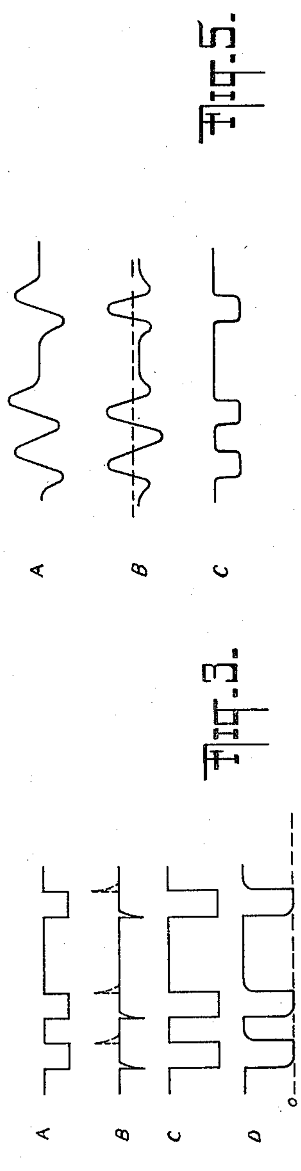
Fig. 3 is a series of waveforms of the electrical signals at various indicated points in the circuit of Fig. 2.
Fig. 5 is a series of waveforms of the electrical signals at various indicated points in the reading circuit.

The output from the differentiating circuit 41 is coupled to a clipper-amplifier circuit indicated at 46. The clipper comprises a diode 48 connected to the grid of the single amplifier stage 50 of the amplifier. The diode 48 is biased to conduct when the output across the resistor 44 is below a predetermined level. This level is indicated by the dotted line of waveform B, Fig. 5. Thus the clipper limits the more negative portions of the signal. The positive peaks of the signal are limited by grid current flow in the resistor 45. The effect of the limiting by both the diode and the resistor is to produce a "squared" output from the amplifier 50. Waveforms of the signals at the indicated points in the schematic circuit of Fig. 4 are shown in Fig. 5.

So that the flux level of the surface of the drum is always the same before recording pulses and so that any previous pulses recorded on the drum are erased, a source of D.-C. erase bias, as indicated at 52, is connected to the erasing head 20. The erase current is of such magnitude that the residual flux level in the drum surface after passing under the erase head is at saturation.

Where it is desired to store information for more than one revolution of the drum, the D.-C. bias can be interrupted following the recording of the input information, or the output from the reading circuit can be gated to the input of the recording circuit to re-record the information as it is read out by the reading circuit.

Figures 6, 7:
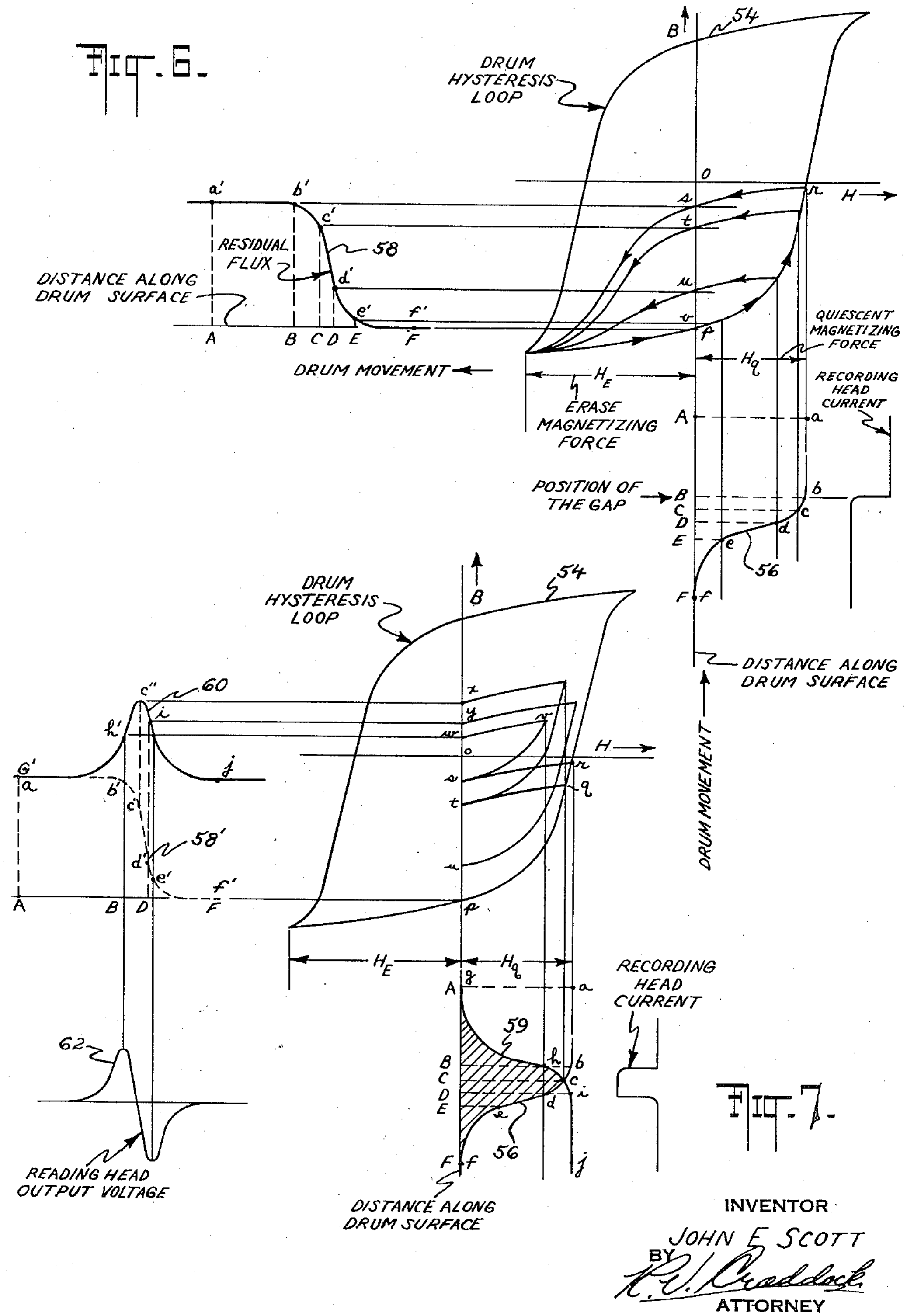
Figs. 6–9 are a series of diagrams used in explaining the theory of operation of the present invention.

The theory of operation of the above-described recording system can best be understood by reference to the diagrams of Figs. 6–9. Fig. 6 shows the resulting residual flux pattern on the drum when the magnetizing current through the drum is interrupted. In this figure is shown a hysteresis loop 54 of the magnetic surface of the drum, with the field intensity H being plotted along the X-axis and the flux density B being plotted along the Y-axis. Curve 56 of Fig. 6 shows the field distribution along the surface of the drum up to the instant the current through the recording head is interrupted. Position A on the drum has already passed the gap of the recording head and so has had a maximum applied field $H_q$, called the quiescent magnetizing force, applied thereto. Position B on the surface of the magnetic drum is in the center of the gap and so has been subjected also to the maximum field produced by the quiescent magnetizing force $H_q$. However, at positions C, D, E, and F along the drum surface, which have not yet moved into the gap at the time the current is interrupted, the only field applied is the magnetizing force produced by the fringing field effect around the gap, which has a distribution substantially as shown by the curve 56.

The resulting residual flux pattern on the surface of the drum after it moves out of the influence of the recording gap can be shown by projecting the values of the magnetizing force H at points *a*, *b*, *c*, *d*, *e* and *f* onto the hysteresis loop 54. Assuming that an erase magnetizing force $H_e$ has been applied to the surface of the drum by the erase head 20, the residual flux level of the drum prior to entering the recording gap will be at the saturation level indicated at point *p* of the hysteresis loop. Positions on the surface of the drum subjected to the maximum quiescent magnetizing force $H_q$ are partially demagnetized along the hysteresis loop to the point *r*. After passing the head 16, the residual flux on the surface of the drum drops back along a minor hysteresis loop to the point *s*. Positions *c*, *d*, *e* and *f* along the surface of the drum, which are never subjected to the full quiescent magnetizing force $H_q$ because of the interrupting of the current to the head, are partially demagnetized to a correspondingly lesser degree along the hysteresis curve 54. After passing beyond the recording head, the flux density returns to the corresponding residual flux levels as indicated respectively at *t*, *u*, *v* and *p*. The resulting plot of residual flux as a function of position along the surface of the drum is shown by the curve 58, plotted to the left of the hysteresis loop along the X-axis of Fig. 6.

It will be seen from Fig. 6 that even though the current through the recording head is abruptly terminated, the residual flux level along the surface of the drum does not change abruptly, but increases gradually toward the saturation level set initially by the erase head 20. It is this fact, that the change in flux level takes place over a finite portion of the drum surface, that limits the packing factor of the recording system.

Fig. 7 shows what happens to the residual flux on the drum when the quiescent current is again restored in the recording head before the portion of the drum directly under the head at the instant of current interruption has been able to move out of the range of the fringing fields around the recording head. As in Fig. 6, when the current is interrupted, the instantaneous field distribution along the surface of the head is shown by the curve 56 resulting in a residual flux pattern according to the dotted curve 58′. However, when the quiescent current is restored to the recording head at the end of a pulse, the surface of the drum is subjected to a magnetizing force shown by the curve 59, the surface of the drum between the positions A and F being subjected to a magnetic field both before and after interruption of current through the head. This portion of the surface of the drum is therefore subjected to a double demagnetization effect. As in Fig. 6, when the quiescent current is interrupted, the residual flux at positions B, C, and D, along the surface of the drum have respective residual flux values as given at points *s*, *t* and *u* on the Y-axis. However, when the quiescent current is restored at the end of the pulse, these points are again subjected to a magnetic force which raises the residual flux level along minor hysteresis curves in the manner shown. For example, the position B along the surface of the drum during the time the quiescent current is interrupted has a residual flux value of *s*, but when the quiescent current is resumed at the end of the pulse, its flux level is raised to a value *v* as determined by the field intensity corresponding to point *h* on curve 59. The resulting residual flux level at position B on the surface of the magnetic drum then has a value *w* after passing out of the influence of the recording head. Similarly the residual flux at points C and D along the surface of the drum are raised along minor hysteresis loop by the fields produced when the quiescent current is restored, resulting in residual flux values as indicated at points *x* and *y*. The resulting plot of residual flux along the drum is shown by the curve 60, and the resulting voltage induced in the reading head is shown by curve 62. It will be noted that the residual flux actually shifts toward saturation in the opposite polarity to the saturation produced by the erase head when the current is momentarily interrupted.

Figures 8, 9:
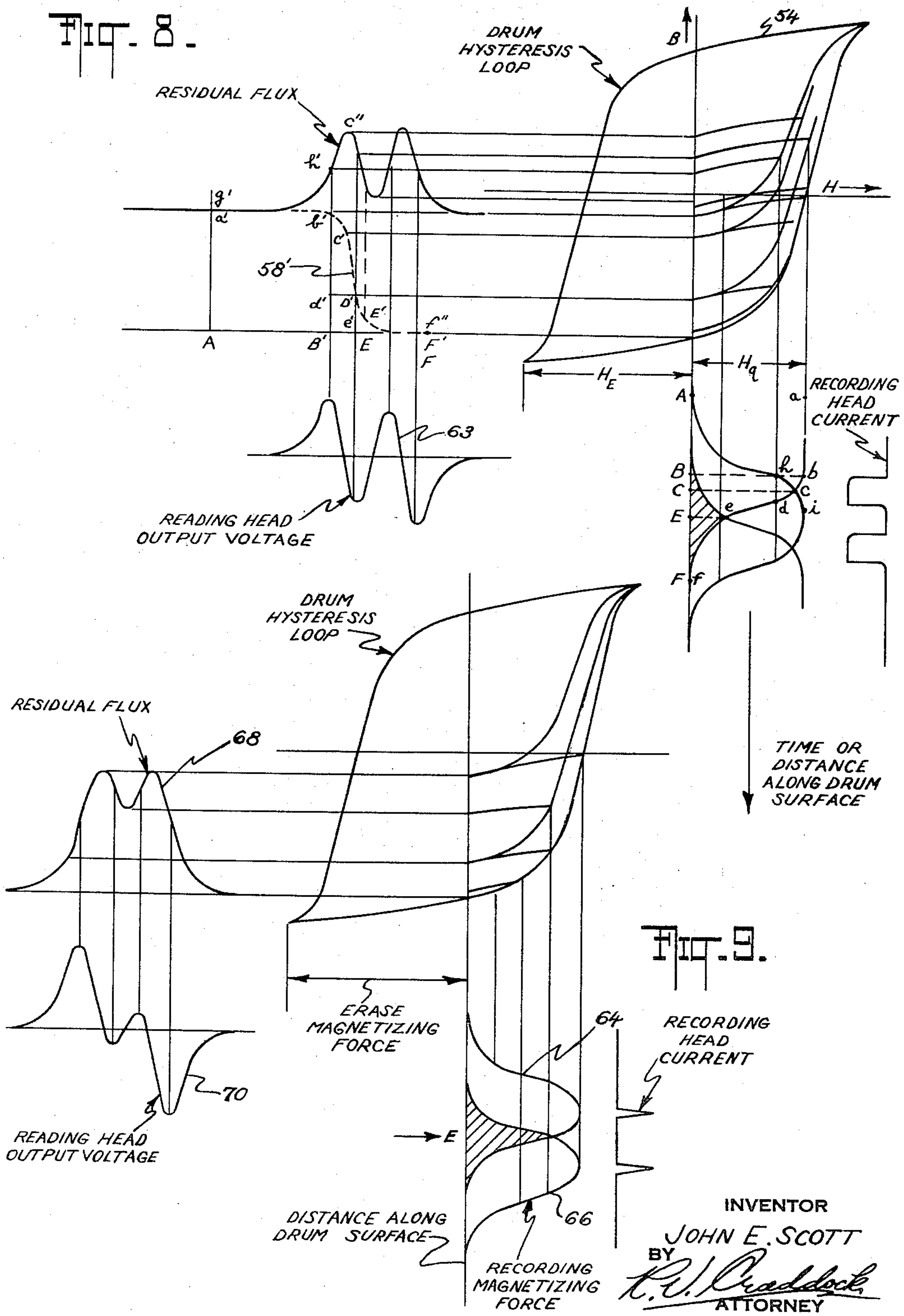

By a similar plotting process in Fig. 8, the residual flux pattern along the surface of the drum resulting from a pair of pulses interrupting the quiescent current to the recording head at successive intervals at the repetition frequency of the pulse information is developed. It will be noted from Fig. 8, that position E along the surface of the drum is subjected successively to three different magnetizing fields, the first one produced by the fringing field of the gap before the position E enters the gap, the second when the position E is in the center of the gap and the third when position E has passed the gap but is in the fringing field of the gap.

The resulting voltage developed across the reading head is shown by curve 63 in Fig. 8. Since the voltage developed across the head depends upon the rate of change of flux produced as the drum passes the reading head, the uniformity of the successive cycles of voltage across the output head depends upon the maximum rate of rise and fall of the residual flux along the drum being substantially uniform.

The advantage of the present recording system in obtaining such a residual flux curve is more apparent by considering Fig. 9, in which the residual flux curve is developed for a pair of pulses which momentarily produce current in the recording head, rather than interrupting it in the manner of the present invention. Thus in Fig. 9 it is assumed that two sharp current pulses at the information pulse repetition frequency are applied to the recording head. The resulting field along the surface of the drum is shown by curves 64 and 66. In the same manner as described in connection with Figs. 6–8, it can be shown that the residual flux pattern along the surface of the drum is that of curve 68. Such a residual flux pattern on the surface of the drum produces a voltage at the reading head as shown by curve 70 of Fig. 9. It will be seen that the voltage swings are quite unequal because the maximum slope of the residual flux curve between successive pulses is much less than the initial slope produced by the first pulse and the tailing off slope produced by the second pulse. Because of this unequal voltage swing with successive pulses, it is impossible to use a single clipping circuit to derive voltage output pulses from the voltage signal produced at the reading head.

What the recording system of the present invention achieves is a greater change of residual flux between successive recorded information pulses by returning the flux level substantially to the level set by the quiescent current. In the previous method of recording pulses illustrated by Fig. 9, the residual flux between successive recorded information pulses does not change nearly as much, since the flux level does not return to the saturation level set by the erase head. By comparing Fig. 8 and Fig. 9 it will be seen that in both cases the residual flux does not return to the initial level between pulses due to the overlap of the fringing fields on that position of the drum (position E in the drum as indicated in the figures). However, as indicated by the shaded area in the figures, the amount of overlap is considerably less according to the recording method of the present invention. The recording system of the present invention has the further advantage that the pulse time duration can be made, and preferably is made, a substantial portion of the period between successive pulses.

From the above description it will be seen that the various objects of the invention have been achieved by the provision of an improved drum recording system in which greater resolution between the recorded pulses is achieved without further complicating the circuitry. This improved resolution permits a higher packing factor.

While the invention has been described as directed toward recording on a drum, the invention is not limited to a drum type recorder, but may be utilized where wire or tape, for example, are used as the recording medium.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for storing information received in the form of electrical pulses comprising a magnetic drum, motor means for rotating said drum, a magnetic recording head, a magnetic erase head, a magnetic reading head, said magnetic heads being positioned at spaced points around the drum, the drum surface successively passing the erase head, the recording head, and the reading head, pulse shaping means responsive to the information pulses for squaring the received information pulse, amplifier means coupling the output of the pulse shaping means to the recording head, the amplifier means being biased to produce a continuous current through the recording head, the amplifier means including means responsive to the output pulse from said pulse shaping means for interrupting the flow of current through the recording head for the duration of the pulse, means for passing a continuous direct current through the erase head to saturate the magnetic drum surface, and means including an amplifier, differentiating network, and clipping circuit coupled to the reading head for reproducing the information pulses from the flux variation produced on the magnetic drum surface by the recording head whereby fringing flux effects are minimized thereby improving the packing factor of said magnetic drum.

2. Apparatus for storing information received in the form of electrical pulses comprising a magnetic drum, motor means for rotating said drum, a magnetic recording head, a magnetic erase head, said magnetic heads being positioned at spaced points around the drum periphery, the drum surface successively passing under the erase head and the recording head, pulse shaping means responsive to the information pulses for squaring the received information pulses, amplifier means coupling the output of the pulse shaping means to the recording head, the amplifier means being biased to produce a continuous current through the recording head, the amplifier means including means responsive to the output pulse from said pulse shaping means for interrupting the flow of current through the recording head for the duration of the pulse, and means for passing a continuous direct current through the erase head to saturate the magnetic drum surface whereby fringing flux effects are minimized thereby improving the packing factor of said magnetic drum.

3. Apparatus for storing information received in the form of electrical pulses comprising a magnetic recording medium, a magnetic recording head, a magnetic erase head, means for moving said recording medium successively past the erase head and the recording head, pulse shaping means responsive to the information pulses for squaring the received information pulses, amplifier means coupling the output of the pulse shaping means to the recording head, the amplifier means being biased to produce a continuous current through the recording head, the amplifier means including means responsive to the output pulse from said pulse shaping means for interrupting the flow of current through the recording head for the duration of the pulse, and means for passing a continuous direct current through the erase head to saturate the magnetic recording medium whereby the packing factor of said magnetic recording medium may be improved by minimizing the fringing flux effects.

4. Apparatus for storing information received in the form of electrical pulses comprising a magnetic recording medium, a magnetic recording head, a magnetic erase head, means for moving said recording medium successively past the erase head and the recording head, means for passing a continuous direct current through the erase head to saturate the recording medium, means for passing a reverse magnetizing current through the recording head to reduce the magnetization level from saturation, and means responsive to received information pulses for interrupting said current through the recording head when a pulse is received for a substantial portion of the period between successive information pulses whereby resolution between the recorded pulses permits a higher packing factor of said magnetic recording medium without further complicating the apparatus.

5. Apparatus for storing information received in the form of electrical pulses, comprising a magnetic recording medium, means for applying a magnetically saturating field to said medium, means for applying a continuous reversed magnetizing field to the magnetically saturated medium to bring the medium to a non-saturated level, the saturating field and the reversed magnetizing field being isolated from each other, means for moving said medium relative to the saturating means and the reversed magnetizing field applying means, the medium being first subjected to the saturating field, and means for momentarily interrupting said reversed magnetizing field for the duration of a received electrical pulse whereby resolution between the recorded pulses permits a higher packing factor of said magnetic recording medium without further complicating the apparatus.

References Cited in the file of this patent

UNITED STATES PATENTS

| | | |
|---|---|---|
| 2,351,004 | Camras | June 13, 1944 |
| 2,378,388 | Begun | June 19, 1945 |
| 2,567,812 | Hickman | Sept. 11, 1951 |
| 2,698,928 | Pulvari | Jan. 4, 1955 |